US010374806B2

(12) United States Patent
Solhjell et al.

(10) Patent No.: US 10,374,806 B2
(45) Date of Patent: Aug. 6, 2019

(54) 2-FACTOR AUTHENTICATION FOR NETWORK CONNECTED STORAGE DEVICE

(71) Applicant: HIDDN SECURITY AS, Oslo (NO)

(72) Inventors: Erik Solhjell, Oslo (NO); Atle Haga, Oppegård (NO)

(73) Assignee: HIDDN SECURITY AS, Oslo (NO)

( * ) Notice: Subject to any disclaimer, the term of this patent is extended or adjusted under 35 U.S.C. 154(b) by 0 days.

(21) Appl. No.: 16/069,843

(22) PCT Filed: Jan. 13, 2017

(86) PCT No.: PCT/NO2017/050013
§ 371 (c)(1),
(2) Date: Jul. 12, 2018

(87) PCT Pub. No.: WO2017/123100
PCT Pub. Date: Jul. 20, 2017

(65) Prior Publication Data
US 2019/0036701 A1   Jan. 31, 2019

(30) Foreign Application Priority Data
Jan. 13, 2016   (NO) .................................. 20160065

(51) Int. Cl.
*G06F 21/00*   (2013.01)
*H04L 9/32*   (2006.01)
(Continued)

(52) U.S. Cl.
CPC ............ *H04L 9/3234* (2013.01); *G06F 21/31* (2013.01); *G06F 21/35* (2013.01); *G06F 21/575* (2013.01); *G06F 21/602* (2013.01);
*H04L 9/0827* (2013.01); *H04L 9/0894* (2013.01); *H04L 9/3226* (2013.01); *H04L 63/08* (2013.01);
(Continued)

(58) Field of Classification Search
CPC . H04L 63/0853; H04L 9/3234; H04L 9/0897; H04L 9/3226; H04L 2463/082; H04L 9/0819; G06F 21/575; G06F 21/62; G06F 21/6209; G06F 21/6218; G06F 21/602; G06F 21/34
See application file for complete search history.

(56) References Cited

U.S. PATENT DOCUMENTS

2011/0087890 A1   4/2011   Munsil et al.
2011/0321146 A1   12/2011   Vernon et al.
(Continued)

OTHER PUBLICATIONS

International Search Report and Written Opinion dated Apr. 11, 2017 issued in International Application No. PCT/NO2017/050013.
(Continued)

*Primary Examiner* — Trong H Nguyen
(74) *Attorney, Agent, or Firm* — Arent Fox, LLP (57) ABSTRACT

The present invention relates to a method and system for 2-factor authentication for access to an encrypted storage device in a computer based on the use of a second communication unit, such as a smart mobile phone, and a network connected server. The second communication unit is configured for receiving an encryption control app for storage of an encrypted key file and for receiving a user PIN. The computer includes an encryption module which receives and decrypts the encrypted key file from the second communication unit for activation of encryption and decryption modules.

13 Claims, 8 Drawing Sheets

(51) Int. Cl.
G06F 21/31 (2013.01)
G06F 21/35 (2013.01)
G06F 21/60 (2013.01)
H04L 29/06 (2006.01)
G06F 21/57 (2013.01)
H04L 9/08 (2006.01)

(52) U.S. Cl.
CPC .. *H04L 63/0853* (2013.01); *G06F 2221/2111* (2013.01); *G06F 2221/2139* (2013.01); *H04L 2209/80* (2013.01); *H04L 2463/082* (2013.01)

(56) References Cited

U.S. PATENT DOCUMENTS

| | | |
|---|---|---|
| 2013/0268758 A1 | 10/2013 | Schrecker |
| 2014/0351589 A1 | 11/2014 | Chenna |
| 2016/0005032 A1 | 1/2016 | Yau et al. |

OTHER PUBLICATIONS

Norwegian Search Report dated Jul. 22, 2016 issued in Norwegian Application No. 20160065.

Uymatiao, Mariano et al.: "Time-based OPT Authentication via secure tunnel (TOAST): A mobile TOTP scheme using TLS seed exchange and encrypted offline keystore," 2014 4th IEEE International Conference on Information Schience and Technoloty, pp. 225-229, Shenzhen, Apr. 26, 2014.

Zhang, Yingjun et al.: "TrustTokenF: A generic security framework for mobile two-facto authentication using trustZone," 2015 IEEE Trustcom/bigDataSE/ISPA, pp. 41-48, Helsinki, Aug. 20, 2015.

2-FACTOR AUTHENTICATION FOR NETWORK CONNECTED STORAGE DEVICE

CROSS-REFERENCE TO RELATED APPLICATION

This application is a 35 U.S.C. § 371 National Phase of PCT Application No. PCT/NO2017/050013 filed Jan. 13, 2017 which claims priority to Norwegian Application No. NO 20160065 filed Jan. 13, 2016. The disclosure of these prior applications are hereby incorporated by reference herein.

To protect information stored on hard disks, solid state (non-volatile) disks and other form of storage devices, the computer industry has developed methods and devices for encrypting and decrypting the stored contents using various forms of encryption methods. The encryption/decryption operation may be controlled and executed by a dedicated software program or the encryption/decryption system may be implemented in hardware which may be operated in combination with an associated software program.

As computing power has increased significantly year for year, new and more powerful encryption methods have been developed to ensure adequate protection, depending upon the actual requirements. Storage devices used in highly sensitive environments like military, police and national security will typically require a higher degree of security that storage devices used in more regular environments like normal office and public environments. However, due to sophisticated and frequent attacks from internet hackers the need for more adequate and secure data protection is increasing also for regular business and private users. It is also a fact that since more and more mobile computing devices are deployed during the regular working days and when travelling, the number of lost and/or stolen devices is also rising rapidly, further elevating the need for secure data encryption.

The security level of an encryption method relies both on the actual encryption method as well as on the method used to authenticate the user. Even the most sophisticated encryption technology is of little value if the access to the system is not adequately protected. The simplest and least secure authentication method is based on the use of just a single pin code or password. A typical example is the standard file protection method implemented in various well-known programs used for text editing. A single password is often the only requirement to gain access to encrypted files (and access to most computers is also typically only controlled by a simple password). Many users also rely on using the same PIN code or password both to open the computer and for enabling file encryption. Anyone with access to the password can then read any files on the computer even if it has encryption protection.

The storage device(s) residing inside a computer is obviously one of the most important areas that need to be protected against harmful attacks. The computer industry has established a special group, the Trusted Computing Group (TCG), focusing on standards aimed at increasing the overall security level of encryption and associated authentication methods. The group has established security standards especially suitable for computing devices produced in high volumes for the mass (low end) market, by standardizing methods that avoid the use of special dedicated high cost items. This includes the decision to store critical security elements such as encryption keys, inside the computer in non-volatile memory (hard disk, solid state disk or other types of non-volatile memory. While this is assumed acceptable for computers aimed at the personal mass market, high security conscious users, in private and/or governmental sector, require encryption and authentication systems where the associated encryption keys are not stored inside the computer when it is powered down.

To improve the overall security of encryption systems the computer industry has implemented various forms of two-factor authentication methods requiring, not just a knowledge factor (PIN/Password), but also a possession factor. A typical two-factor authentication method is the use of credit card for shopping: the credit card is first slided or inserted into the reader (the possession factor) and thereafter the user key in the PIN code (knowledge).

In the computer industry a similar example is the use of smart cards. The user is provided with a personal smart card with one or more installed encryption keys. To enable the encryption or decryption operation, the user has to place the smart card in a special smart card reader integrated with or connected to the computer. The user must also key in a PIN code or password and this will allow encryption code(s) to be passed from the smart card to the computer, enabling data storage and the regular operation of the computer.

Thus this two-factor authentication method satisfies the requirement of both the knowledge factor (the PIN/password) and the possession factor (the smart card) to open up the encryption system.

While this form of two-factor authentication is significantly more secure than just using a single PIN/Password, it still has drawbacks, both from a security point and from a commercial point (product cost). Since the solution also requires loading of a PIN code or password via a keyboard, it means that at least a portion of the encryption key package must reside inside the computer. That is not an optimum solution from a security point of view. Alternatively, the computer may also be equipped with a dedicated key pad for providing the PIN/password; however, this represents another cost in addition to the cost of the smart card reader. Therefore, from a cost point of view, such additional system cost is normally only accepted in environments requiring very high security levels (military, hospital, oil industry, financial industry). But even here, an extra device is another device liable to malfunction, hence not fulfilling the user's requirement to access the data.

In addition to the problems mentioned above, the fact that a user needs to always bring the smart card in order to run the computer may also be considered a problem, especially for systems aimed to be used in more regular business environments. The problem to be solved by the present invention can be defined to be to provide a means for a high security system that is easy to use and still have a low additional cost compared to regular computing devices of the same class.

The present invention may be implemented in a computer consisting of a processing unit, one or more storage peripherals and at least one encryption/decryption device. The encryption device may either be built into the processing unit or into the storage peripheral unit(s) or residing as a separate unit linked to the processing unit and the storage peripheral(s). Furthermore, the encryption keys associated with the operation of the encryption/decryption device shall remain in the computer for maximum as long as it is powered on, or an optional emergency key erase mode is executed before power off. To enhance overall security no encryption keys shall be stored in non-volatile memory inside the computer.

The present invention comprise using a second communication unit, such as a smart mobile phones, or similar devices with connections to the a communication system, such as a phone communication network, like tablets, to facilitate the two-factor authentication procedure. In the case the second communication unit is a smart phone, the novel use of such mobile phone in the authentication process means that the user do not need to carry a dedicated device, like a smart card, to fulfill the possessing requirement of the authentication process. A user will not consider a mobile phone to be an additional item since today most people carry a mobile phone.

In a first embodiment of the invention a method and system is provided for the initial (one-time) setup of a computer device to enable the encryption/decryption process and to introduce a smart mobile phone as the possessing item required for a two-factor authentication. This involves an automated network based, such as internet, communication between the computer, the mobile phone and a dedicated server system set up or controlled by the computer supplier/manufacturer or a trusted party. The process may also involve a user payment to the computer supplier/manufacturer or a trusted party for the use of the encryption/decryption feature. A server system provides the basic program information to the mobile phone to initialize the phone for the authentication process. The process may comprise that an encrypted key file and the associated communication program is stored on the mobile phone. Furthermore, the exchange of information between the mobile phone and the computer may be based on a short range communication technology, for example Bluetooth, optical communication, Near Field Communication (NFC) or other, meaning that the mobile phone may need to reside close to the computer device for a defined period of time in order for the authentication procedure to be executed according to requirements.

In a second embodiment of the present invention a method and system is provided for the regular turn-on and turn-off of an encryption-enabled computer using a smart phone as the main vehicle to start up the computer. The method comprises a communication between the mobile phone and the computer where the mobile phone transfers a pre-installed encrypted key file to the computer. If the encryption device within the computer determines that the encrypted key file is the correct one, it will allow the computer to start up the regular boot process. The exchange of information between the mobile phone and the computer may be based upon Bluetooth, NFC, optical or similar short range communication technology.

In a third embodiment of the invention a method and system is provided for automatic turn-down of the computer in case the mobile phone is moved a longer distance away from the computer than the reach of the short range communication technology between the mobile phone and the computer.

Abbreviations and Expressions

The following abbreviations and expressions used in this document shall be understood to encompass, but not be limited by, the following descriptions:

| | |
|---|---|
| App | A program especially suitable to operate inside a smart mobile phone, SMP |
| Boot | The code and process to start up the computer in regular operation (after PBC) |
| Bluetooth | A wireless technology standard for exchanging data over short distances using short-wavelength radio waves |
| CM | Crypto Module, a device that can perform encryption and decryption of data information transmitted to and from a storage device |
| Computer | Any computing device having at least one CPU, at least one storage device for the data information and a CM device |
| Computer ID | A unique identification for each single computer |
| CPU | Central Processing Unit |
| ECA | Encryption Control App |
| ECC | Encryption Control Code |
| Key File | A unique pattern always stored in encrypted form and use to enable the regular encryption process within a computer |
| KF | Key File |
| NFC | Near Field Communication - A communication technology standard that enables devices like smart mobile phones to communicate with other similar devices and computers via radio communication by arranging the devices close to each other. |
| NWI | Network Interface - Connections via internet |
| PBC | Pre Boot Code |
| PIN code | Personal Identification Number code |
| Password | A string of letters, numbers and other symbols that may be used as the knowledge part of a TFA process |
| SD | Storage Device - Hard disks, Non-volatile solid state disks |
| SMP | Smart Mobile Phone - With the ability to run programs (apps) and communicate via internet and SRCI |
| SRCI | Short Range Communication Interface - A short range communication interface and system either based upon the use of Bluetooth or NFC interface radio communication or based upon short range light (including IR (infrared)) communication |
| TFA - | Two Factor Authentication. A method to provide unambiguous identification of a user by means of a combination of two different components, typically a knowledge component, a possessing component or a component inseparable from the user. |

FIGURES DESCRIPTIONS

The following attached figures describe method, system and embodiments of the invention.

| | |
|---|---|
| FIG. 2 | Block diagram of basic outline of the concept of the TFA activation of the CM module in the computer by using the mobile phone |
| FIG. 3 | Block diagram of overview of the concept of the two factor authentication process using a SMP |
| FIG. 4 | Block diagram of overview of the concept of the lock-down of an encryption enabled computer when the SMP is removed outside the SRCI contact distance |
| FIG. 5 | System overview of the main components involved in the concept of the initialization process at the beginning of the process. |
| FIG. 6 | Block diagram of overview of the initialization process to enable the computer for encryption/decryption |
| FIG. 7 | Block diagram for an external (stand-alone) disk system with a built in encryption/decryption module. |
| FIG. 8 | External disk in FIG. 7 connected to a computer system (PC/Laptop or Tablet) |
| FIG. 9 | External disk system in FIG. 7, with external wireless transmitter/receiver |
| FIG. 10 | External disk drive equipped with built in keyboard and display for two-way communication with mobile phone |

DETAILED DESCRIPTION OF THE FIGURES AND EMBODIMENTS

Figure 1:
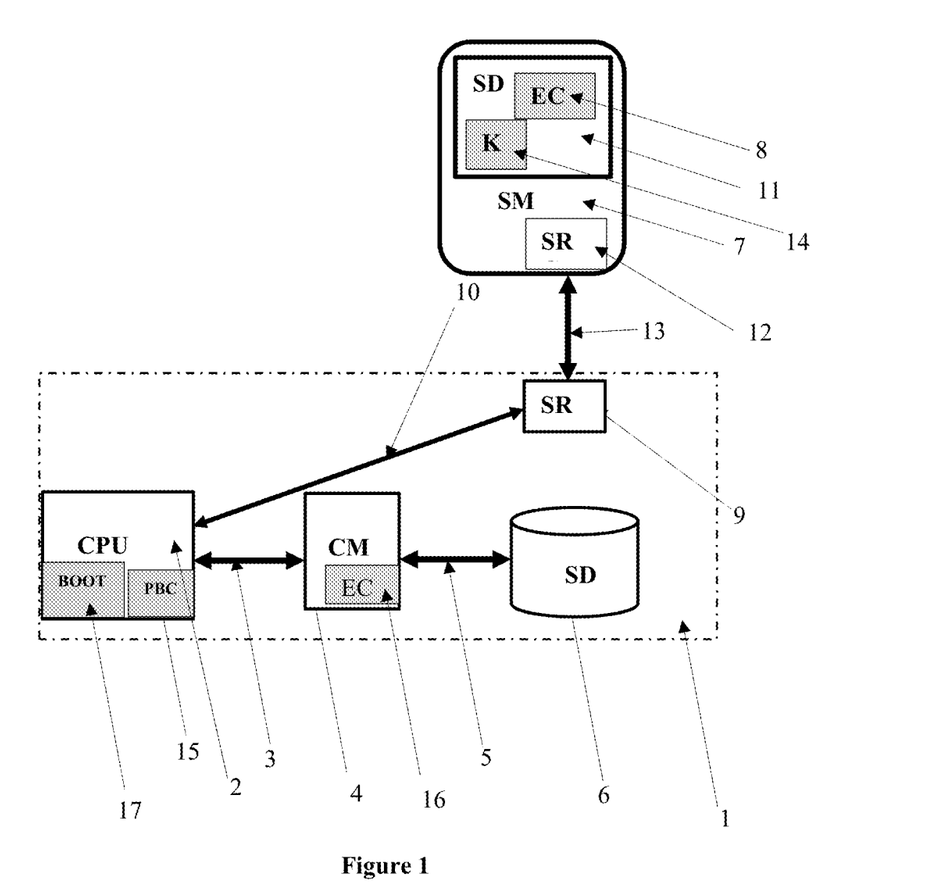
FIG. 1  System overview of the main components involved in the concept of the two-factor authorization process

The following describes advantageous embodiments of the invention supported by the referenced figures. FIG. 1 describes an overview of the basic concept. It outlines a computer enclosure 1, that comprises a CPU module 2, a crypto module CM 4, a storage device SD 6, two-ways interconnection 3 between the CPU 2 and the CM 4; two-ways interconnection 5 between the CM 4 and the SD 6 and a short range communication interface SRCI 9 with two-ways interconnection 10 between the CPU 2 and the SRCI 9. The figure also comprise a smart mobile phone SMP 7 with embedded short range communication interface SRCI 12 that can perform two-ways communication 13 using radio and/or light waves communication (optics including infrared) with the SRCI module 9 in the computer enclosure 1. The mobile phone SMP 7 also has a storage area SD 11 where special encryption control app ECA 8 and an encrypted Key File KF 14 reside. The CPU module 2 contains a special preboot program PBC 15 which is immediately activated each time the computer is powered on. When the PBC 15 is activated it will communicate with embedded encryption control code ECC 16 in the CM 4. The CPU module 2 also contains a regular BOOT code 17 that is activated when the PBC code 15 operation has completed.

Figure 2:
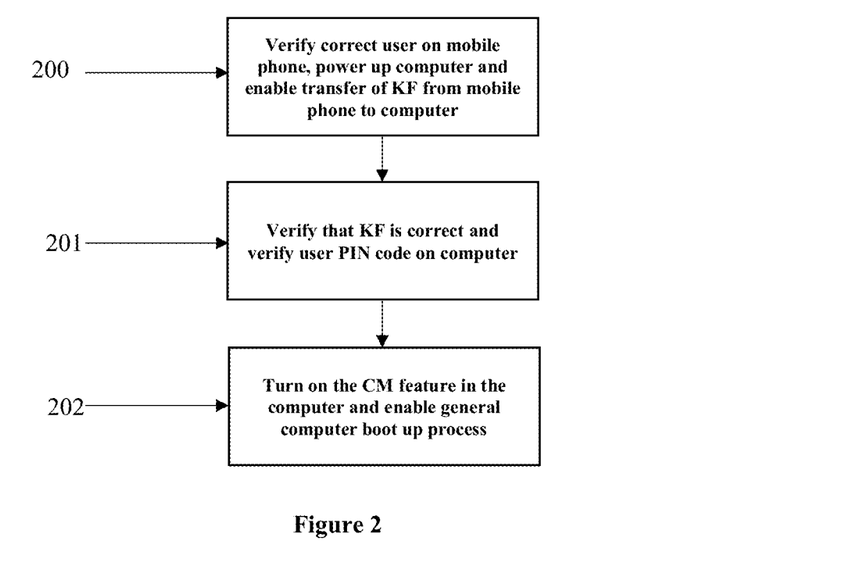

The data path 3, 5 between the CPU 2 and the Storage Module SD 6 goes via the crypto module CM 4, if CM 4 is activated. CM 4 has the ability to encrypt all data being transferred from the CPU 2 to the SD 6 and decrypt all data being transferred from SD 6 to CPU 2. In order to perform such encryption and decryption operation, the CM 4 must be enabled to do so. FIG. 2 outlines one alternative concept scenario for this enabling procedure, while FIG. 3 shows this alternative scenario procedure schematically in more details.

In the concept scenario described in FIG. 2, the mobile phone SMP 7, containing the special encryption control app ECA 8 and the encrypted key file KF 14, is assumed turned on and the ECA 8 has asked for user PIN to verify that the user is the correct one. The ECA 8 is ready to communicate with the computer 1. When the computer 1 is powered 200 the SMP 7 transfers the encrypted KF 14 to the CM 4.

The CM 4 then verifies 201 that the encrypted KF 14 is correct and asks for a user PIN code. If the CM 4 determines 201 that both the KF 14 and the user PIN code are correct, it will turn on 202 the encryption/decryption engine within the CM 4 and activate the BOOT code 17 which comprise the regular boot operation for the computer 1. The correctness of KF 14 and the PIN code may be verified by that a Master Password used for encrypting the KF 14 has been encrypted with the PIN code and been stored in the CM 4 or computer system 1. When the CM 4 receives the KF 14 and the PIN code, it will first decrypt the Master Password using the PIN code, and then decrypt the KF 14 using the Master Password, hence when CM 4 uses the keys from the decrypted KF 14 to initiate boot process it will succeed only if the PIN code and the KF 14 has been correct. The system may provide a timer for maximum numbers of attempts for transferring KF 14 and PIN code. The encrypted Master Password may optionally only be stored on the SMP 7, and transferred together with the encrypted KF 14 when starting operation of the computer (1).

Figure 3:
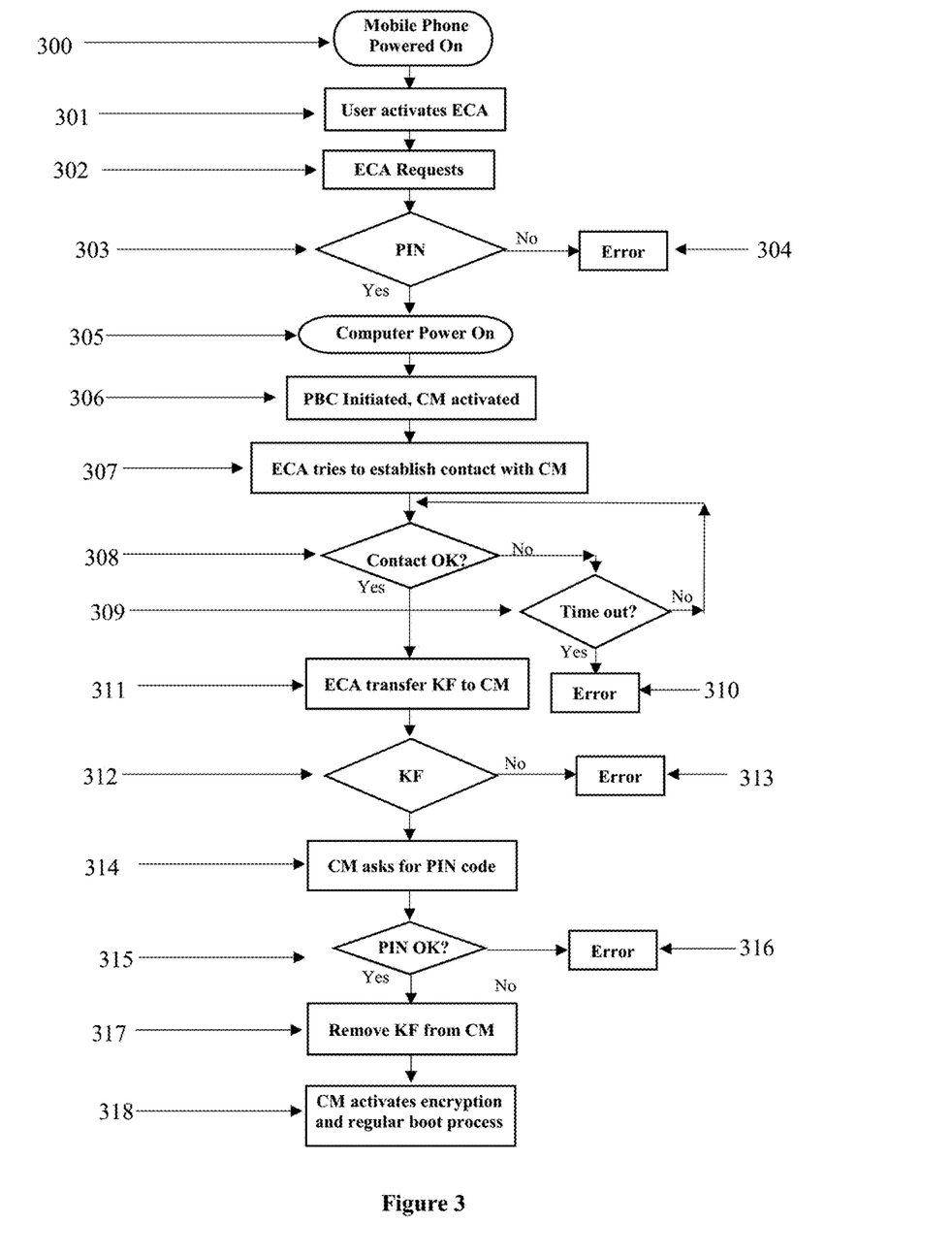

FIG. 3 describes the scenario in FIG. 2 in more detail, again referring to FIG. 1. In FIG. 3 it is assumed that the mobile phone SMP 7 has been turned on 300 and activated correctly. In order to activate the encryption operation in computer 1, the user will start up the ECA app 8. The ECA 8 may request 302 a first user PIN code in order to verify that the user is the correct user allowed to start up the computer 1. If the PIN code is incorrect, the ECA will report an error message 304 and terminate the operation.

If the PIN code is correct the ECA will instruct 305 the user to turn on the computer 1. When turned on the PBC 15 in the computer 1 will activate the CM 4, the ECC code 16 and the short range communication interface SCRI 9. The ECA 8 will then enable the SRCI 12 in the mobile phone SMP 7 and try to establish 307 contact with the computer 1 via the radio or light link 13. It will check for contact 308 until it is established or a timer is timed out 309. If the timer is timed out, an error message will be shown 310.

Once the short range contact is established, the ECA will transfer 311 the encrypted KF 14 to the computer 1. The encrypted KF 14 will be checked 312 in the CM 4. If it is deemed incorrect 313 an error message will be displayed and the operation terminated.

If the KF 14 is deemed correct, CM 4 may ask 314 for a second user PIN code. If so, the CM will check the validity of the PIN code 315 and if it is not correct it will issue an error message 316 and terminate the operation. If the pin code is correct, the CM will decrypt an encrypted Master Password which is used to decrypt the encrypted KF, activate its encryption/decryption process 318, remove 317 the encrypted KF from its internal memory, and let the CPU 2 turn on the regular BOOT code 17 operations 319.

In another scenario, the first PIN code requirement 302 described in FIG. 3 may be dropped if it is determined that the second PIN code requirement 314 in in FIG. 3 together with the transfer of the encrypted KF has a security level high enough for the environment the computer 1 is designed to operate in. This is especially true if the second PIN code requirement 314 is replaced by a requirement to read the user's finger print, provided the computer 1 is equipped with a finger print reader, or one such can be associated with the computer. Alternatively, other means of unique biometric verification may also be used, for example: a reading device reading the user's iris.

In yet another scenario, the first PIN code requirement 302 in FIG. 3 may be replaced by a requirement to read the user's finger print, provided the mobile phone SMP 7 is equipped with such a finger print reader. Alternatively, other means of unique biometric verification may also be used, for example: a reading device reading the user's iris.

Since the encrypted KF in the CM 4 is removed once it is verified as correct, it is impossible for an intruder to later get access to this KF through any interfaces of the computer. Also all data, when stored in the SD 6, is encrypted and therefore protected against illegal intruders.

Figure 4:
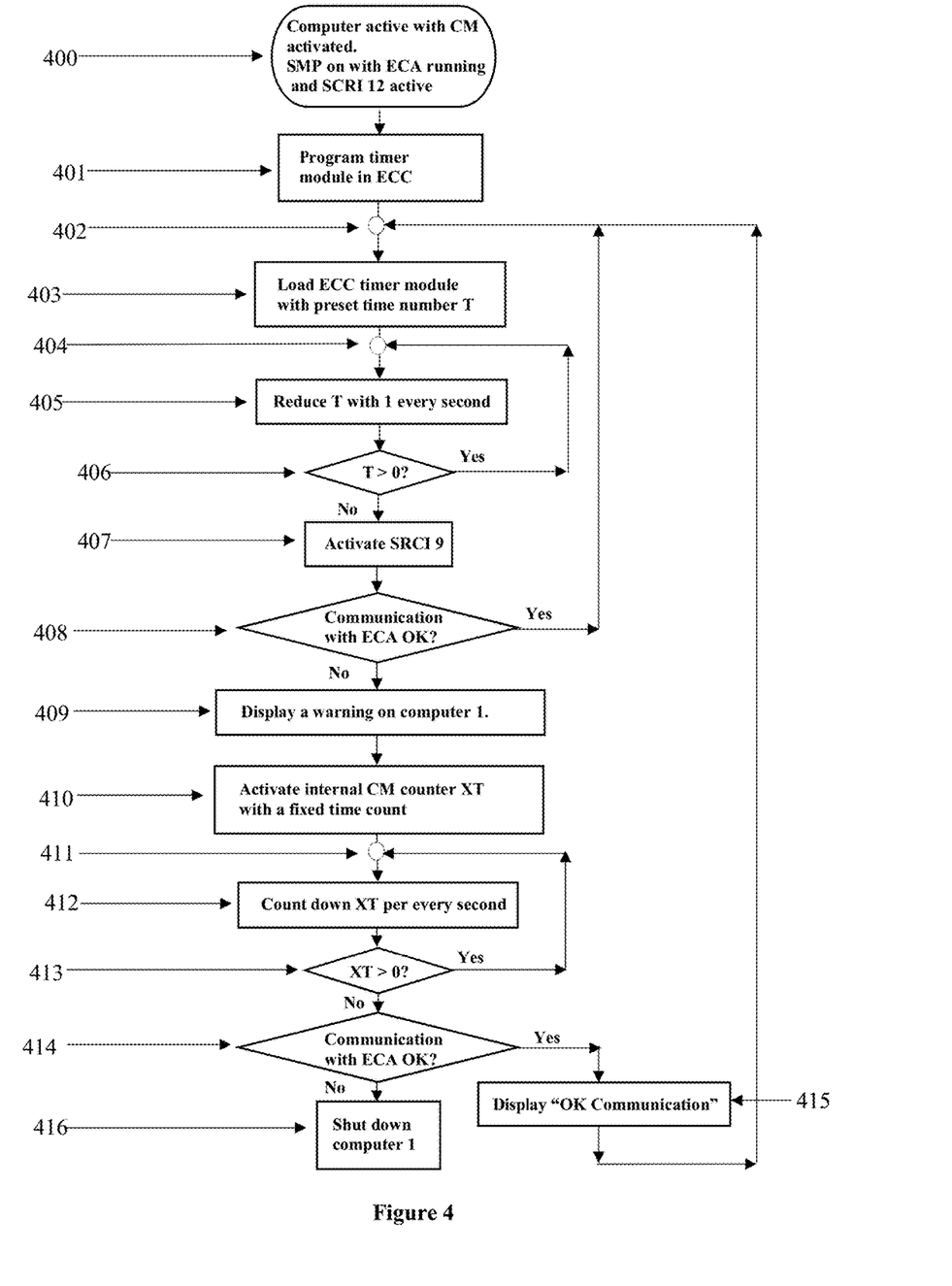

In yet another scenario, the computer 1 with the active ECC program 16 in the CM 4 may be set up so that it regularly checks that the mobile phone SMP 7 is within reach by the short range communication system defined by SRCI 9, SRCI 12 and the link 13 and shut down the whole computer 1 operation if the link is not active or the mobile phone SMP 7 is beyond reach of the short range communication system. FIG. 4 shows schematically one implementation of such feature.

In FIG. 4 it is assumed 400 that the computer 1 has been turned on and that the CM 4 has been correctly activated. Furthermore, it is also assumed that the smart mobile phone SMP 7 is powered on and that the ECA 8 is actively running with the short range communication interface SRCI also active. Further, it is also assumed that a program timer module has been implemented as a part of the ECC 16 code in the CM 4 and that this timer program is activated 401.

In order to define a valid time period for verifying that the SMP 7 is located close to the computer 1, a preset time number T is loaded 403 into the timer module in ECC 16. The time number T may be freely chosen. In a typical implementation a time number T representing a time between 2 and 10 minutes may be chosen.

The time counter in ECC 16 will then count down 405 the time number T. In figure 405 it is assumed that the timer counts down every second, but any time interval is supported by the present invention.

The time counter then checks 406 if the number T is above zero. If so, it will go back 404 and continue the process of counting down T.

When the counter discovers that T is not above zero it will activate 407 the SCRI 9 and check 408 if there is a correct communication with the ECA 8 via the SCRI 9, the optical or radio link 13 and the SCM 12 in the SMP 7. If the contact is OK, the system will go back 402 and reload 403 the time counter with the number T once more, repeating the complete process.

However, if the user has removed the mobile phone SMP 7 so far away from the computer 1 that there is no communication between the ECC 16 and the ECA 8 via the SRCI 9, SCRI 12 and the optical or radio link 13, the ECC code 16 will display 409 a warning to inform the user that it is necessary to bring the mobile phone SMP 7 into close contact with the computer 1 again in order to avoid that the operation of the computer 1 is not terminated and the computer 1 shut down. The user is given a (short) time to bring the mobile phone SMP 7 back into the proximity of the computer 1. A second counter XT in the CM 4 is loaded 410 with the preset time number XT and the second counter is counting down 412 and checking 413 whether the second counter has reached zero. Of not it will continue 411 counting down.

Once the second counter XT has reached zero, it will once more check 414 if the communication with the ECA 8 is OK. If so, it will display a positive message 415 to the user of the computer 1 and go back to the beginning 402 of the loading 403 of the counter number T to the timer module in ECC 16. Thereafter, the whole process is repeated.

However, if the communication with ECA 8 is not established 414, the ECC 16 will terminate 416 the whole process in computer 1 and shut down computer 1.

The procedure described in FIG. 4 further improves the operational security level of the computer 1 in that it is impossible to operate the computer 1 for any length of time without the smart mobile phone SMP 7 residing in the proximity of the computer 1 all the time.

In order to use the smart mobile phone SMP 7 to control the secure operation of the computer 1 system as described by FIGS. 1, 2, 3 and 4 and the associated text, the smart mobile phone SMP 7 and the computer 1 must initially go through a set up procedure to ensure that the associated TFA is properly set up and the encryption module CM 4 in the computer 1 is activated correctly. This is typically done when the user first start up computer 1 and will normally involves communication with an approved security software portal, typicallyrun by or approved by the manufacturer/supplier of the computer 1. This initial security setup procedure may be implemented in different ways. One implementation scenario is shown in FIGS. 5 and 6.

Figure 5:
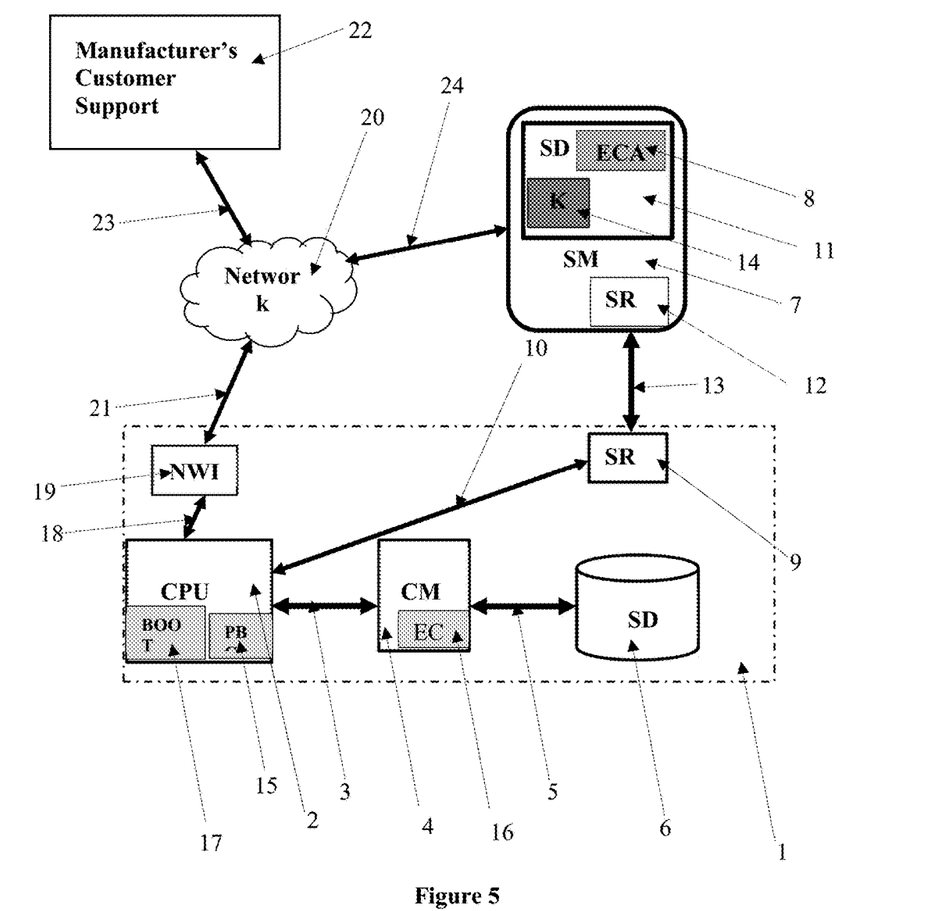
Figure 6:
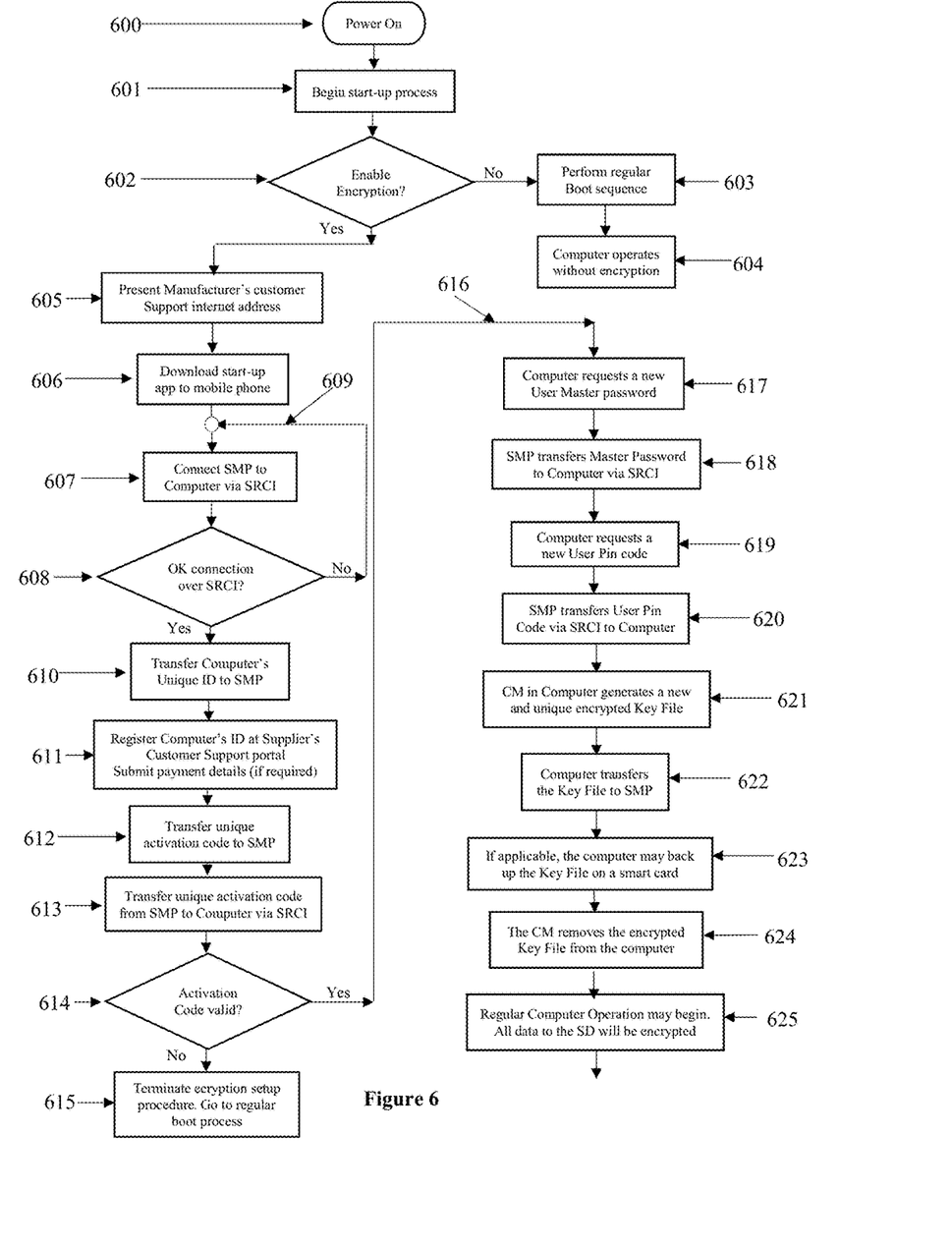

FIG. 5 shows one scenario to initiate the TFA setup procedure. It is assumed that the computer 1 and the smart mobile phone SMP 7 are the same as shown previously in FIG. 1 and described in the associated text. However, at this initial stage, the encryption control app ECA 8 and the encrypted key file KF 14 have not yet been loaded into the memory SD 11 of the mobile phone SMP 7. FIG. 5 also shows that computer 1, in addition to the features already shown in FIG. 1, is equipped with a network interface NWI 19 communicating internally with the CPU 2 via a communication bus 18. Furthermore, FIG. 5 also shows that the computer via NWI 19 is linked to a network 20 via the communication channel 21. The network 20 may represent the whole internet network or the network 20 may be an internal network that further may be linked to the internet.

The smart phone 7 is also linked to the network 20 via communication channel 24.

FIG. 5 also shows a Manufacturer's Customer Support Server 22 with a portal to help communicate with customers. The Manufacturer's Customer Support server 22 is connected to the network 20, allowing both computer 1 and the mobile phone SMP 7 to communicate with the Manufacturer's Portal 22. The network 22 and the communication channels 21, 23, 24 can be of any type, including wired, wireless, fiber, radio or other.

To set up the computer 1 for data encryption and ensure a reliable and secure TFA process between the computer 1 and the smart mobile phone 7, the user needs to go through a special setup procedure. FIG. 6 shows one scenario for such a setup procedure.

In this scenario the computer 1 when powered up by a user for the first time 600 will begin a special start-up procedure 601 by asking 602 if the user wants to activate the encryption/decryption technology built into the computer. If the answer is NO, the computer will immediately go to a regular first time boot sequence 603 activating the booth process 17 and thereafter operate 604 without the CM device 4 enabled.

If the user accepts to activate the encryption/decryption mode, the computer 1 will present 605 the user with the network address to the manufacturer's customer support server 22 and ask the user to download 606 a dedicated Encryption Control App ECA 8 to the mobile phone SMP 7 via the network 20 and the associated gateways 23 and 24. Once the ECA 8 is downloaded, it may be started up and enable the short range communication interfaces SRCI 2 in order for a direct communication link 13 to be established between the computer 1 and the smart mobile phone SMP 7. The ECA 8 will check 608 if the short range connection with the computer 1 is OK. If not, it will retry 609 until communication is established (or the process times out).

When the communication link is OK, the ECA 8 will ask that the computer's 1 unique ID to be transferred 610 to the mobile phone SMP 7. Thereafter it will register 611 this ID at the Manufacturer's Customer Supply server 22. If required, a payment process between the user and the Manufacturer's Server Site may take place.

The Manufacturer's Customer Support portal will then transfer 612 via network 22 and the associated gateways 23, 24 a unique activation code to the user's smart mobile phone SMP 7. The ECA 8 in the smart mobile phone SMP 7 will then transfer 613 this unique code to the computer 1 via the short range communication system defined by SRCI 9, 12 and the link 13.

Thereafter the CM 4 in the computer 1 will check 614 the validity of the activation code. If it is deemed not correct, CM 4 will instruct the CPU 2 to terminate the process and proceed to the regular boot process 17 without any activation of the CM 4 device.

However, if the CM 4 device determines that the received activation code is valid, it will proceed by asking 617 the user for a Master Password. The user inputs the chosen Master Password to the smart mobile phone SMP 7 and the ECA 8 program then transfers 618 this Master Password to the CM 4 in the Computer 1.

The process proceeds by the computer 1 asking 619 the user for a new Pin Code. The ECA 8 will then transfer 620 this pin code to the CM 4 in the computer 1 via the short range communication setup SRCI 9, SRCI 12 and channel 13.

The CM 4 in the computer 1 will then generate 621 a new and unique Key File 14 and perform an encryption on this file using very strong encryption techniques.

One option is to encrypt the Key File 14 using the Master Password, and then encrypt the Master Password using the New Pin Code. The encrypted Master Password is stored in the CM using or SD in the computer 1.

The computer 1 will then transfer 622 this encrypted Key File 14 to the smart mobile phone SMP 7 and the ECA 8 will then store the encrypted Key File 14 within its own non-volatile memory SD 11.

If the computer 1 is equipped with a Smart Card interface, the user may choose to back up 623 the encrypted Key File, and optional the encrypted Master Password, on a Smart Card via the Smart Card interface. The CM 4 will then remove 624 the encrypted Key File from the Computer 1 and instruct 625 the computer 1 to open up for regular use. All data from the CPU 2 to the storage device 6 will be encrypted by the CM 4 device. Likewise, all data read from SD 6 will be decrypted by CM 4 before transferred to CPU 2.

Since all communication between the computer 1 and the mobile phone SMP 7 during this encryption setup procedure is handled by the short range communication interfaces SRCI 9 and 12 over the link 13 the process is very secure and very difficult to interfere for an outside party. Also, once the Crypto Module CM 4 is enabled, the encrypted Key File is removed from the computer 1, making it impossible for an outside intruder to penetrate the computer 1 and get access to the CM 4 operation. And data is always stored securely encrypted in the SD 6.

When present invention discusses storage disk, and storage peripherals it is to be understood that it also comprise any network- or output/input-interface connected storage devices, such as for example a USB connected storage disk.

Figure 7:
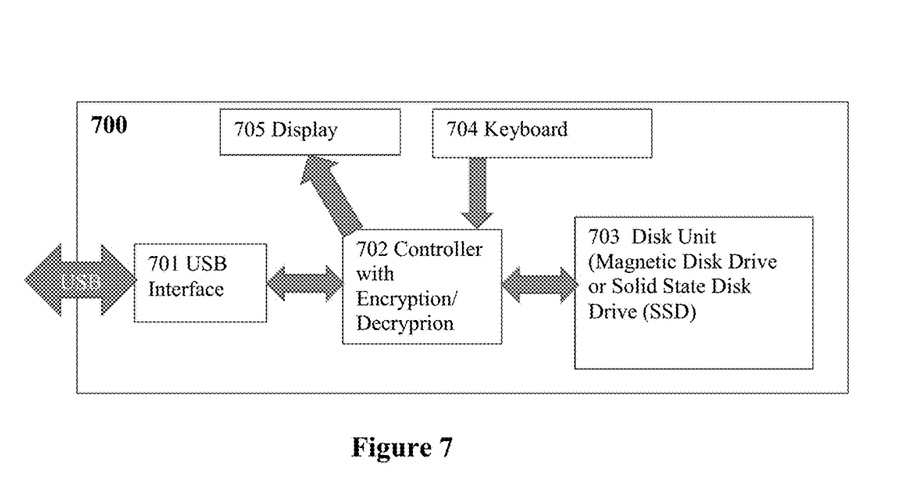

A further method according to the present invention for using a mobile phone to authenticate an encrypted disk system embedded in a Laptop, Tablet or PC may be provided for a stand-alone (external) encrypted disk system. FIGS. 7-10 show various alternatives of such embodiments. FIG. 7 describes a block diagram for an external (stand-alone) disk system with a built in encryption/decryption module.

FIG. 7 shows the principle build-up of an external unit/disk system 700 that may be connected to a PC, Laptop, Tablet or similar device via a USB or similar data transfer connection interface/system. The external unit 700 may be equipped with a USB or similar data transfer controller 701, a controller module 702 with built-in encryption/decryption technology, a hard disk drive or solid state disk drive 703 for storing the encrypted data and the external unit 700 may optionally have some form of keyboard 704 and/or display 705 to enable a user to interface with the external disk system 700.

To activate and utilize this external unit/disk system 700 in a secure, controlled manner, it is necessary to transfer the specific Password/Pin and Key information from the mobile phone to the controller 702.

Figure 8:
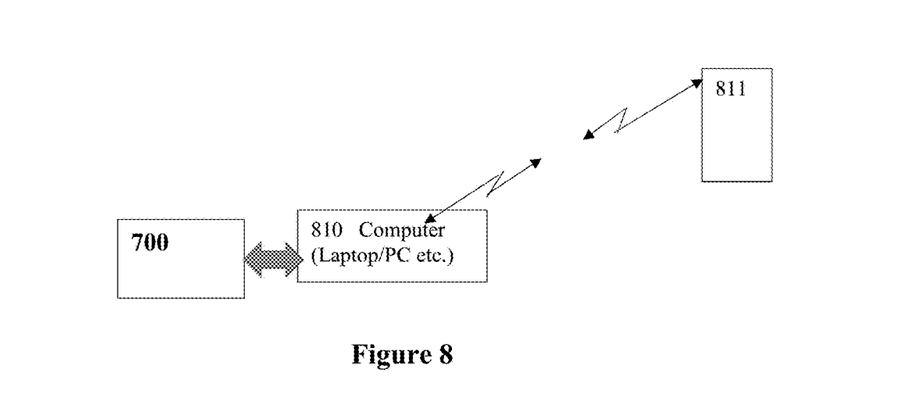

FIG. 8 shows one method embodiment where the external disk 700 in FIG. 7 is connected to a computer system (PC/Laptop or Tablet) 810 and the necessary Password/PIN and Key information is transferred as previously described from the mobile phone (cell phone) 811 to the computer system 810 via close range wireless system like NFC or Bluetooth. In a further embodiment even a type of WLAN may be used, and then the connection range will potentially be longer. Once the necessary key information is transferred to the computer system the key information required to activate the encryption/decryption system inside the controller 702 is transferred via the (USB) interface 701.

Figure 9:
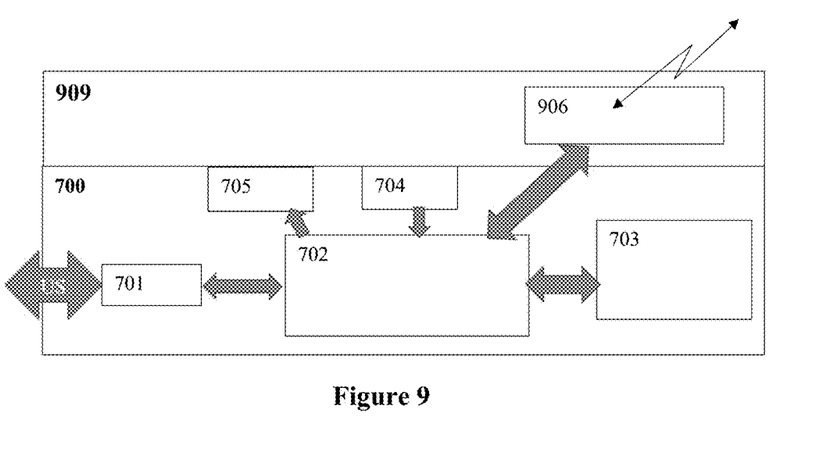
Figure 10:
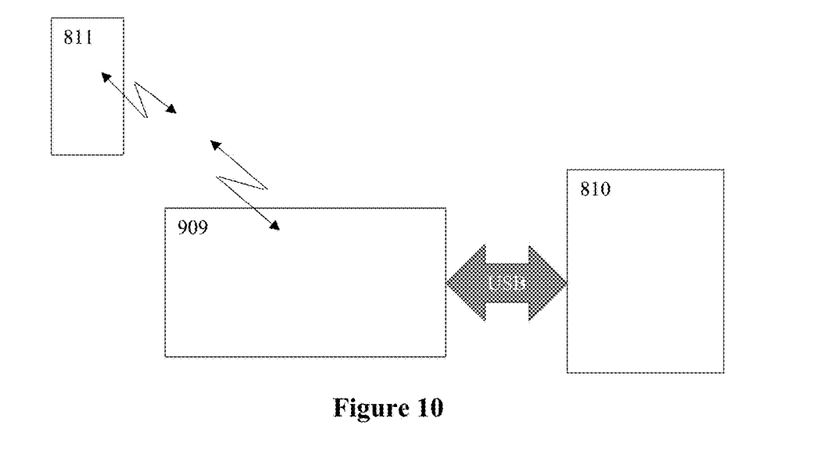

For many application, a further improved method embodiment is shown in FIGS. 9 and 10.

FIG. 9 shows the same external disk system 700 as described in FIG. 7, a further external wireless transmitter/receiver 906 is comprised in the external disk system 909. The further external wireless transmitter/receiver 906 may be an NFC or Bluetooth or other similar short range system, or for longer range systems, a type of WLAN may be used.

The external disk drive system 909 with its built-in wireless connection module 906 may then communicate directly with the mobile phone (Cell phone) 811 as shown in FIG. 10. The necessary key information (Password/PIN etc.) may be transferred directly from the mobile phone 811 to the external disk system 909 in order to control the activation of the encryption/decryption module within the controller 702. With this system it is possible to avoid any transfer of key information from the mobile phone via the computer 810 to the external disk 909.

Once activated directly from the mobile phone 811, the external disk 909 may be connected to a computer 810 to facilitate the transfer of data between the encrypted external disk 909 and the computer 810.

As previously described, the encrypted external disk drive 909 may comprise a built in keyboard and/or display for providing two-way communication between the mobile phone 811 and the user of the disk system 909 during the authentication process. However, it is also possible to envision a system where the external disk drive 909 have no keyboard and display and the all communication with the user is handled by mobile phone 811 interfaces, and thus enabling control of the complete 2-way authentication process from the mobile phone 811.

The invention can also be described as a first embodiment of a method for 2-factor authentication for access to an encrypted storage device 6 in a computer system 1 comprising the steps, when initiating the computer system 1 for encryption of the storage device, of:

a user downloading from a network connected server 22 an encryption control app 8, ECA, to a smart mobile phone 7, SMP;

the user activating the ECA 8;

the ECA 8 establishing a short range communication connection 13 to a computer 1 comprising an encryption module 4, CM;

the ECA 8 retrieving from the computer 1 a unique ID, and then transferring this ID to the network connected server 22;

the network connected server 22 transferring an activation code to SMP 7, and the SMP 7 transferring the activation code to the computer 1;

the user inputting a Master Password and a PIN code to the SMP 7, and the ECA 8 transferring the Master Password and the PIN code to the CM 4;

the CM 4 generating a Key File 14 comprising keys to be used by the CM 4 in encryption and decryption operations, and then encrypting Key File 14 using the Master Password as the encryption key, and then encryption the Master Password using the PIN code as encryption key;

transferring the encrypted Key File 14 to the SMP 7 and storing it within the SMP 7;

deleting the Key File 14 and the Master Password in the computer 1, storing the encrypted Master Password in the computer 1; and the method further comprises the steps of, when the computer system is attempted started up on subsequent occasions after the initiation of the computer system for encryption of the storage device:

transferring the stored encrypted KF 14 from the SMP 7 to the CM 4;

the user typing the PIN code on the SMP 7;

transferring the PIN code from the SMP 7 to the CM 4;

CM 4 decrypting the encrypted Master Password using PIN code as encryption key;

CM 4 decrypting the Key File 14 using Master Password as encryption key;

CM 4 activating encryption and decryption modules with encryption keys from Key File 14;

computer 1 deleting encrypted Key File 14 and unencrypted Master Password.

A second method embodiment according to the first method embodiment, wherein the network connected server 22 initiating and receiving a payment from the user before transferring the activation code to SMP 7.

A third method embodiment according to the first or second method embodiment, wherein the computer 1 transferring the encrypted KF 14, and optionally the encrypted Master Password to a connected Smart Card.

A fourth method embodiment according to the first method embodiment, wherein the computer 1 will boot with encrypted SD 6 when successful initiating procedure has been performed, and will boot with unencrypted SD 6 when initiating procedure has not been performed or have unsuccessfully been performed.

A fifth method embodiment according to the first method embodiment, wherein the computer 1 will boot with encrypted SD 6 when successful 2-factor authentication has been performed, and fail to boot when one or more of the following steps occur:

SMP 7 is not running with an ECA 8, wrong encrypted KF 14 has been transferred to CM 4 wrong PIN code has been transferred to CM 4

A sixth method embodiment according to the first method embodiment, wherein the CM 4 is running, will subsequently be terminating operation once an embedded encryption control code ECC 16 in the CM 4 via a short range communication interface 9, SCRI, comprised in the computer 1 loose contact for longer than a preset timer value with the ECA 8 in the SMP 7 via a short range communication interface 12, SCRI, comprised in the SMP 7.

The invention can also be described as a first system embodiment for 2-factor authentication for access to an encrypted storage device 6 in a computer system according to the method defined in claims 1, 2 and 4 to 6, comprising:

a computer system 1 comprising one or more storage devices 6, SD, and one or more encryption modules 4, CM, for encryption/decryption of data to/from the respective SD 6;

a smart mobile phone 7, SMP;

a server 22 for transferring an activation code to SMP 7;

wherein the SMP 7 is in communication contact with the server 22 for receiving the activation code.

A second system embodiment according to the first system embodiment, wherein the computer system 1 and the SMP 7 comprises short range communication interfaces 9, 13, SCM, for communication between the two.

A third system embodiment according to the first system embodiment, wherein the communication channel between the computer system 1 and the SMP 7 is an encrypted communication channel.

A fourth system embodiment according to the first system embodiment, wherein the communication channel between the server 22 and the SMP 7 is Internet.

A fifth system embodiment according to the first system embodiment, wherein the communication channel between the server 22 and the SMP 7 is an encrypted communication channel.

A sixth system embodiment according to the first system embodiment, wherein the system further comprises a smart card, and the computer system 1 comprise a smartcard interface, for transferring an encrypted Key File 14 from the CMs 4 to the smart card via the smart card interface.

A seventh system embodiment according to the first to sixth system embodiment wherein the computer system 1, 700 comprising one or more storage devices 6, 703, is further connected to a second computer 810, the second computer 810 using the computer system 1, 700 as an external unit/disk system 700 once the external unit/disk system 700 has been authenticated and activated.

The invention claimed is:

1. A method for 2-factor authentication for access to an encrypted storage device in a computer system, the method comprising the steps, in response to initiating the computer for the encryption of the storage device, of:
   downloading from a network connected server an encryption control application (ECA) to a smart mobile phone (SMP);
   activating the ECA;
   establishing, by the ECA, a short range communication connection to the computer comprising an encryption module (CM);
   retrieving by the ECA from the computer, a unique ID, and then transferring the unique ID to the network connected server;
   receiving, by the SMP, an activation code from the network connected server, and the SMP transferring the activation code to the computer;
   receiving a Master Password and a PIN code from a user at the SMP, and the ECA transferring the Master Password and the PIN code to the CM;
   generating, by the CM, a Key File comprising encryption keys to be used by the CM in encryption and decryption operations, and then encrypting the Key File using the Master Password as a first encryption key, and then encrypting, by the CM, the Master Password using the PIN code as a second encryption key;
   transferring the encrypted Key File to the SMP;
   storing the encrypted Key File within the SMP;
   deleting the Key File and the Master Password in the computer;
   storing the encrypted Master Password in the computer; and the method further comprising the steps of, in response to the computer is attempted to be started up on subsequent occasions after the initiation of the computer for the encryption of the storage device:
   transferring the stored encrypted Key File from the SMP to the CM;
   receiving the PIN code at the SMP;
   transferring the PIN code from the SMP to the CM;
   decrypting, by the CM, the encrypted Master Password stored in the computer using the PIN code transferred from the SMP as the second encryption key;
   decrypting, by the CM, the stored encrypted Key File transferred from the SMP using the decrypted Master Password as the first encryption key;
   activating, by the CM, encryption and decryption modules with the encryption keys from the decrypted Key File; and
   deleting, by the computer, the stored encrypted Key File transferred from the SMP and the decrypted Master Password.

2. The method according to claim 1, further comprising initiating and receiving, by the network connected server, a payment from the user before the receiving of the activation code by the SMP.

3. The method according to claim 1, further comprising transferring, by the computer system, the Key File encrypted by the CM or both the Key File encrypted by the CM and the encrypted Master Password, to a connected Smart Card.

4. The method according to claim 1, further comprising booting the computer with encrypted storage device when an initiating procedure has been successfully performed, and booting the computer with an unencrypted storage device when the initiating procedure has not been performed or was unsuccessfully performed.

5. The method according to claim 1, further comprising booting the computer with an encrypted storage device when the 2-factor authentication has been successfully performed, and failing to boot the computer in response to one or more of the following steps occur:
   the SMP is not running with the ECA,
   a wrong encrypted Key File has been transferred to the CM, or
   a wrong PIN code has been transferred to the CM.

6. The method according to claim 1, in response to the CM is running, further comprising subsequently terminating an operation once an embedded encryption control code (ECC) in the CM via a first short range communication interface (SRCI) comprised in the computer loses contact for longer than a preset timer value with the ECA in the SMP via a second short range communication interface, SRCI, comprised in the SMP.

7. A system for 2-factor authentication for access to an encrypted storage device in a computer, comprising:
   an encryption control application (ECA);
   one or more storage devices (SDs);
   one or more encryption modules (CMs) for encryption/decryption of data to/from the one or more SDs;
   a smart mobile phone (SMP);
   a network connected server for transferring an activation code to the SMP via a communication channel, wherein the SMP is in communication contact with the network connected server for receiving the activation code; and
   wherein the system is configured to perform, in response to initiating the computer for the encryption of the storage device, the steps of:
   activating the ECA;
   establishing, by the ECA, a short range communication connection to the computer comprising a CM of the one or more CMs;
   retrieving by the ECA from the computer, a unique ID, and then transferring the unique ID to the network connected server;
   receiving, by the SMP, the activation code from the network connected server, and the SMP transferring the activation code to the computer;
   receiving a Master Password and a PIN code from a user at the SMP, and the ECA transferring the Master Password and the PIN code to the CM;
   generating, by the CM, a Key File comprising encryption keys to be used by the CM in encryption and decryption operations, and then encrypting the Key File using the Master Password as a first encryption key, and then encrypting, by the CM, the Master Password using the PIN code as a second encryption key;
   transferring the encrypted Key File to the SMP;
   storing the encrypted Key File within the SMP;
   deleting the Key File and the Master Password in the computer;
   storing the encrypted Master Password in the computer; and
   in response to the computer is attempted to be started up on subsequent occasions after the initiation of the computer for the encryption of the storage device:
   transferring the stored encrypted Key File from the SMP to the CM;
   receiving the PIN code at the SMP;
   transferring the PIN code from the SMP to the CM;

decrypting, by the CM, the encrypted Master Password stored in the computer using the PIN code transferred from the SMP as the second encryption key;

decrypting, by the CM, the stored encrypted Key File transferred from the SMP using the decrypted Master Password as the first encryption key;

activating, by the CM, encryption and decryption modules with the encryption keys from the decrypted Key File; and deleting, by the computer, the stored encrypted Key File transferred from the SMP and the decrypted Master Password.

8. The system according to claim 7, wherein the computer and the SMP each comprises short range communication interfaces (SRCI) for communication between the computer and the SMP.

9. The system according to claim 7, wherein a communication channel between the computer system and the SMP is an encrypted communication channel.

10. The system according to claim 7, wherein the communication channel between the network connected server and the SMP is Internet.

11. The system according to claim 7, wherein the communication channel between the network connected server and the SMP is an encrypted communication channel.

12. The system according to claim 7, further comprises:

a smart card including a smartcard interface for transferring the Key File encrypted by the CM using the Master Password as the first encryption key from the one or more CMs associated with the one or more SDs to the smart card via the smart card interface.

13. The system according to claim 7, wherein the computer is further connected to a second computer, the second computer using the computer as an external unit/disk system once the external unit/disk system has been authenticated and activated.

* * * * *